June 3, 1958 P. J. BISSEY 2,836,996
PIPE BORING MACHINE
Filed April 21, 1955
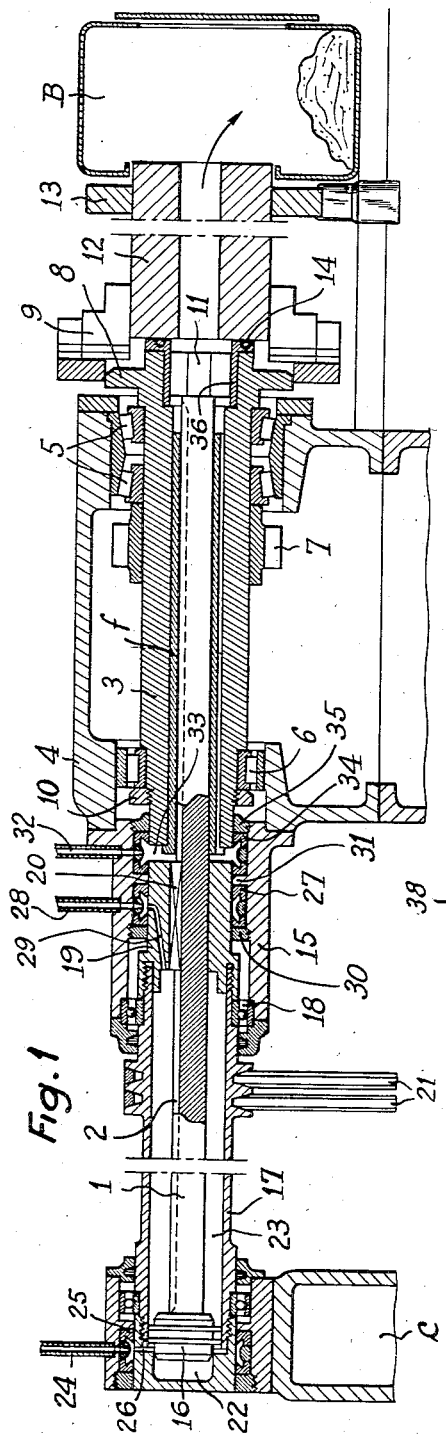
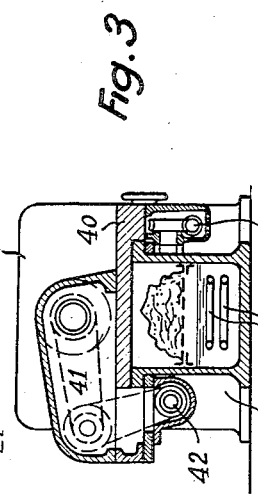
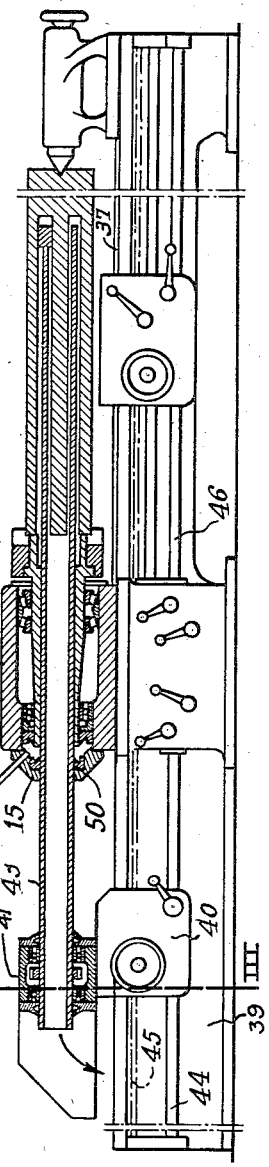

United States Patent Office 2,836,996
Patented June 3, 1958

2,836,996

PIPE BORING MACHINE

Paul Jacques Bissey, Tarbes, France

Application April 21, 1955, Serial No. 502,895

Claims priority, application France April 23, 1954

12 Claims. (Cl. 77—3)

This invention relates to means for machining the inner bore in tubes or pipes, particularly pipes of considerable length. Such machines generally comprise a spindle adapted to drive the work in rotation and an inner tool-carrier bar, which in some cases is also driven in rotation.

Such machines are bulky and expensive, particularly because of the requirement of long guide benches along which the carriage supporting the tool-carrier bar may slide. Since the tool is required to act over the full length of piping to be bored, benches some thirty feet long or longer often have to be provided for the sole purpose of guiding the tool.

In another known type of machine, the tool carrier bar is rotated by a motor supported on the carriage, and the carriage in turn is traversed by hydraulic means. However, because of the necessity of making the rotary drive and the longitudinal traverse independent from each other, the hydraulic ram motor had to be located in displaced relation to the axis of the tool-carrier bar. This consumed further space and required the use of complex rigid transmission drives from the hydraulic ram or motor to the tool carrier bar.

In yet other types of tube boring machines, a hollow spindle is used through which the tool carrier bar is made to extend, while the work is supported from an end supporting plate or chuck. Such hollow spindles have to be provided with large diameters, because of the necessity of having to provide an inner bearing for the rotation of the spindle, and/or because the inner diameter of the spindle, may not be less than the bore diameter of the finished tube, in order to ensure a proper discharge of the cuttings. Specially designed antifriction bearings have to be provided. Moreover the moment of inertia of such large-diameter revolving masses is high thereby restricting the angular speeds which may successfully be imparted thereto. This entails a reduction in the admissible cutting speeds, and makes it necessary to employ tools of the "slow-cutting," carbide type. The complication and bulkiness of the requisite reducer gearings is also objectionably increased.

It is an object of this invention to provide a tube boring machine-tool, the over-all bulk of which will be comparatively small for a given length of tubing to be machined.

Another object is to provide a machine-tool of the above-mentioned general type utilizing a hollow spindle, wherein the spindle diameter is substantially reduced.

Yet another object is to eliminate the use of a guide bench for a tool-carrier spindle in a pipe boring machine.

Still a further object is to accomplish both the rotation and guiding of the tool carrier bar from the same means as that producing the longitudinal traverse of the bar.

An additional object is to provide a machine of the type specified wherein all the components are grouped into a unitary assembly including the headstock of the machine.

An object also is to provide such a machine whereby two or more machining operations may be accomplished successively or simultaneously without having to remove the work from the machine, and regardless of the length of the inner bore.

A specific advantage of the invention is that an improved machine tool embodying the teachings thereof can readily be provided from a conventional slide lathe or other machine of similar class, without interfering with the normal operation of the machine. Thus, it will be possible to perform on a single machine, in addition to the external turning operations, any boring and drilling operations, and more generally all and any of the internal machining operations made possible by the provision of a tool disposed within a recessed or bored workpiece.

The invention in a principal aspect comprises the provision, in conjunction with a machine-tool of the general class including lathes, of a toll-carrier bar of considerable length, arranged for rotation and sliding traverse within the axial bore of a hollow spindle extending from the fixed headstock of the machine, which spindle directly surrounds the tool carrier bar and is mounted for rotation in an outer bearing. The traverse of the tool carrier bar is of such length as to enable the tool to operate over the full extent of the longest work with which the machine is to be used. The axial working traverse displacement of the bar in either direction is accomplished by push and pull action respectively.

Moreover, the tool carrier bar can be rotated in either sense of rotation. The rotation of the bar serves to control the relative cutting speed of the internal tool so as to impart thereto an optimum selected value without altering the set cutting speed selected for the external tool of the machine, where such is provided. The rate of bar rotation, accordingly, is adjustable and a meter is provided for at all times indicating the relative rate of rotation of the bar with respect to the work.

According to a further feature of the invention, an improved flow system is provided for the coolant oil whereby said oil will flow from the spindle along the bar and past the tool and out from the free extremity of the work. In this connection, means are provided whereby the feed pressure of the coolant oil can be made to act upon a tool-carrier head serving as a piston, whereas the bore of the workpiece is used as a cylinder either to impart forward movement to the tool carrier bar, or to reduce the axial compressive stress acting on the bar, as the case may be.

In a preferred construction of the novel machine, the rotational drive of the tool carrier bar is accomplished simultaneously with the guiding and axial traverse thereof, by means of an hydraulic ram assembly wherein the piston rod constitutes the tool carrier bar itself. Since the thrusts to be exerted for accomplishing the axial traverse are comparatively low, e. g. in the order of 300 to 400 kgs., the sectional area of the cylinder can be made quite small, and the guiding action, which conventionally is exerted by separately provided and machine benches, is thus directly achieved, in the novel machine, by the internal walls of the cylinder. Since the cylinder is bodily rotatable with the piston rod, the bar can easily be driven from outside through the intermediate of the cylinder which in turn may be driven from the main motor powering the machine, or an auxiliary motor if preferred.

Some exemplary embodiments of the invention will now be described with reference to the accompanying drawings, given by way of illustration but not of limitation, and wherein:

Fig. 1 is an axial section of an improved machine in the condition obtaining at the start of a boring operation accomplished by pushing action;

Fig. 2 is a side view in elevation with parts in axial section, of a novel machine provided with tool of the boring bit type.

Fig. 3 is a cross section on line III—III of Fig. 2.

As shown in the drawings, the machine comprises a tool carrier bar 1, which is solid and is formed with a longitudinal keyway 2 throughout its length. The bar 1 extends coaxially in the bore of a hollow spindle 3 of a slide lathe in which the invention is shown as embodied for purposes of illustration. The lathe spindle is mounted for rotation with respect to the fixed headstock 4 in outer bearings 5 and 6. The spindle 3 is driven in rotation from within the headstock assembly through a spur gear annulus 7 receiving its drive from any suitable source. The spindle 3 has an outer end protruding beyond the headstock assembly (to the right thereof as shown in Fig. 1) and carrying a faceplate or chuck 8 with four jaws 9. The spindle is positioned by means of a flange 10 adjustably screwed on the spindle and abutting the bearing 6. A tubular spacer member f is inserted between the outer periphery of bar 1 and the inner wall of spindle 3.

It will be noted that with the arrangement so far described that there are no parts of substantial dimension interposed between the bar and the spindle, nor is there any considerable amount of clearance therebetween, so that the spindle diameter may be reduced to a minimum. The tool 11 is carried at the right hand end (as shown) of the bar 1 and in the initial or starting condition is received within a complementary recess formed in the chuck 8. The outer diameter of the tool relative to the spindle is such that the tool must at all times remain positioned on the same (right-hand) end of the spindle and cannot traverse the spindle bore.

The work or length of piping to be bored is shown at 12 and is supoprted on one side within the four jaws of chuck 8 and at its other end in a conventional work-rest 13.

Since the coolant oil is arranged to flow from the left end of the spindle to the free or right-hand end of the work, suitable clearance or passage ways are provided through the spacer insert f. A sealing gasket 14 interposed between the adjacent end faces of the workpiece and the spindle prevents outflow of the coolant oil.

Beyond the left hand end of the headstock assembly 4 is a casing structure 15 which surrounds the bar 1 and is connected to the spindle assembly 3 for integral rotation therewith. The casing 15 supports one end of a drive and guide assembly for the bar 1, presently described, while the far end of said assembly is supported in a suitable bearing rest C sealed at its far end.

The drive and guide assembly essentially comprises a piston 16 secured to the end of bar 1 remote from that carrying the tool 11 and slidably received within a cylinder 17 which has its opposite ends rotatably supported in bearings such as 18. The cylinder 17 has its right hand end sealed by a cylinder head member 19 received in the casing 15 and adapted to have the bar 1 slidably therethrough. The bar 1 is connected for bodily rotation with cylinder 17 by means of a key 20 projecting from cylinder head 19 into cooperating engagement with the keyway 2 in the bar. By providing the drive connection between the cylinder and the bar 1 at the end of the cylinder nearest the tool, objectionable torsion effects are minimized in operation. For a similar reason, the cylinder 17 is driven in rotation by a belt drive 21 received in a drive pulley integral with the cylinder adjacent the right-hand end thereof.

The piston 16 divides the cylinder space in two chambers 22 and 23. Chamber 22 is supplied with pressure fluid from a pressure line 24 opening into a dual annular seal assembly 25 the inner space of which communicates with cylinder chamber 22 through a duct 26. A similar annular seal 27 is provided around the head member 19 and has its inner chamber communicating with cylinder chamber 23 by a duct 29, and connected with another pressure line 28. The seal 27 is applied by a flange 30 against a shoulder 31 of the casing 15.

The coolant oil is delivered by a supply line 32 into a chamber 33 defined between the adjacent end faces of head member 19 and spindle 3 and outwardly defined by a seal 34 respectively engaging said head member and spindle, and applied by a presser flange 35 against the shoulder 31.

To impart a longitudinal traverse displacement to the tool-carrier bar, pressure fluid is delivered into one or the other of supply lines 24 or 28. With the arrangement described, it will be noted that pressure oil from chamber 23 will be liable to leak past the key 20 and mingle with the coolant oil in chamber 33. In accordance with the invention, this condition is rendered harmless by the fact that the pressure fluid used to operate cylinder 17, is similar in composition to the coolant oil. It has been found that the characteristics of many standard grades of coolant oil are adequate for producing a perfectly satisfactory operation of the cylinder. Moreover, the pressure on piston 16 when chamber 23 is under pressure, is measured during operation by measuring the back-pressure obtaining in supply line 24. In this way, the leakage which is intentionally allowed to occur through the keyway 2 will not affect the accuracy of the measurements. Similarly, the rate of traverse is in all cases measured by indicating the rate of flow through line 24, in one or the other sense of flow.

In Fig. 1 the tool is illustrated at the start of a boring operation accomplished by "push" action; in this condition the tool is positioned within a centering ring 36. Throughout the boring operation the cutting oil is delivered from the left, flows past the tool, carrying the cuttings with it, and out at B to the sump where it is filtered, cooled and taken up again all in a conventional manner.

It should be observed that the pressure of the cutting oil acting on the upstream end of the boring head places the tool carrier bar under tension and correspondingly reduces, or completely cancels, the compression stress which otherwise might cause it to buckle during the boring operation accomplished by push action. This greatly improves the straightness of the resulting bore. On the other hand, the effect of the pressure during a boring operation effected by pull action is to increase the tension on the bar.

Where desired to operate by pulling action a boring head of special type should be used wherein the cuttings are discharged towards the side which has just been machined. One suitable type of boring head for this purpose has been disclosed for example in French Patent No. 1,114,990.

As will result from the foregoing description of Fig. 1, the conventional guide benches for guiding the boretool carrier bar are herein eliminated and replaced by the single hydraulic cylinder 17.

It should be emphasized that the use of a hydraulic drive is not desirable in cases where the cuttings have to be discharged towards the left of the apparatus as shown, as would be the case there the bore-head and carrier bar illustrated in Fig. 1 were to be replaced by a boring bit type of tool. For such an arrangement would make it necessary to provide a tubular extension through the piston and the front end wall of chamber 22, which extension would have to be as long as the workpiece, thereby objectionably increasing the length of the bar and the over-all length of the machine. In such cases accordingly, it is contemplated according to the invention to use a conventional drive system using a traversing carriage, while retaining the improved reduced-diameter spindle described above.

Referring to Figs. 2 and 3 which illustrate this last mentioned aspect of the invention, the illustrated system comprises a slide lathe including a bench 37 which is extended beyond the stationary headstock 38 of the lathe by a further bench 39 constituting a sealed tank or sump, and the upper edges of which serve as guideways for a carriage 40 supporting the rear bearing 41 for bar 43. The tool carrier bar is driven in rotation by a splined shaft 42 extending on the rear side of bench 39 parallel therewith and connectable through suitable clutch means and multi-speed and reverser gearing, with a power take off on the power drive means for the stationary headstock of the lathe. A gear journalled on the carriage 40 and slidably keyed on splined shaft 42, is provided for imparting motion to the tool carrier bar 43 through a suitable gear train housed within the rear support 41.

Carriage 40 is traversed by means of a further splined shaft 44 cooperating with a rack 45 secured to the bench. Splined shaft 44 is driven in rotation in a manner similar to the conventional traverse bar of the slide-lathe, shown at 46, but independently thereof, through a multi-speed and reverser gearing. The rate of traverse is made automatically proportional to the sum of the combined spindle and tool-carrier bar speeds, as by means of any suitable differential mechanism supported in the stationary headstock assembly.

The cuttings and spent coolant oil are discharged leftwards (as shown) through the interior of the tool carrier bar, and collected in tank or sump 48 shown as being cooled by a cooling coil 49.

In this embodiment of the invention, the tool carrier bar is shown as being slidable in a head member 15 through a seal 50 located adjacent the coolant oil inlet.

What I claim is:

1. In a tube boring machine, in combination, a hollow spindle, means supporting said spindle for rotation and means for rotating said spindle, means for rotatably supporting a tube in alignment with said spindle and means for connecting adjacent ends of said spindle and tube for bodily rotation, annular sealing means between adjacent surfaces of said spindle and said tube, a tool carrier shaft extending through said spindle in closely spaced relation with the periphery of the hollow interior thereof, a boring tool carried on the end of said carrier shaft adjacent said tube for boring engagement with said tube, a hydraulic cylinder, means rotatably supporting said cylinder in alignment with said spindle beyond the end thereof remote from said tube, a piston on the end of said carrier shaft remote from said tool slidably received within said cylinder, said carrier shaft projecting axially into an adjacent end of the cylinder in substantially sealed relation therewith, means connecting said cylinder and carrier shaft for non rotatable axial relative displacement, drive means for rotating said cylinder, first pressure fluid means including delivery lines communicating with opposite ends of said cylinder for selective axial actuation of the carrier shaft, and second pressure fluid means including a delivery line communicating with the end of said spindle adjacent said cylinder for delivering coolant fluid under pressure through the interior of said spindle and past said tool and out through said tube.

2. In a tube boring machine, in combination, a hollow spindle, means supporting said spindle for rotation and means for rotating said spindle, means for rotatably supporting a tube in alignment with said spindle and means for connecting adjacent ends of said tube and spindle for bodily rotation, annular sealing means between adjacent surfaces of said tube and spindle, a tool carrier shaft extending through said spindle in closely spaced relation with the periphery of the hollow interior thereof, a boring tool carried on the end of said carrier shaft adjacent said tube for boring engagement with said tube, means for rotating said carrier shaft relative to said spindle and tube and means for axially displacing said carrier shaft, and coolant fluid means for delivering coolant fluid under pressure into the end of said spindle remote from said tube and through the interior of said spindle past said tool and out through said tube.

3. In a tube boring machine, means rotatably supporting a tube to be bored, a hollow spindle, bearing means supporting said spindle externally thereof for rotation in axial alignment with said tube and having means connecting adjacent ends of said spindle and said tube for bodily rotation, a tool carrier shaft extending through the hollow interior of said spindle coaxially therewith and in closely spaced relation with the periphery of the interior thereof, means supporting said tool carrier shaft for rotation and axial displacement with respect to said spindle and tube, a boring head carried on one end of said carrier shaft adapted for cutting engagement with the inner periphery of the tube, said boring head being larger in outer diameter than the inner diameter of said spindle, the interior of said spindle having an enlarged end section adapted to receive said boring head therein in a retracted position of said carrier shaft, annular seal means between said adjacent ends of the hollow spindle and said tube, and means for circulating coolant fluid from the end of said hollow spindle remote from the tube through said spindle and past said boring head and out through said tube.

4. In a tube boring machine, frame means including first axially aligned spaced bearings, a hollow spindle rotatable in said bearings, gripping means on one end of said spindle beyond a related one of said bearings, second bearing means axially aligned with and spaced beyond said one bearing and adapted to journal one end of a tube to be bored with the other end of said tube engaged by said gripping means for bodily rotation of said tube with said spindle, two third axially aligned spaced bearing means beyond the other one of said first bearings and in axial alignment therewith, a hydraulic cylinder journalled in said third bearing means, a tool carrier shaft extending through said cylinder and said spindle coaxially therewith, a boring head on one end of said carrier shaft adapted for cutting engagement with the inner periphery of said tube and a piston on the other end of said carrier shaft in sliding engagement with the inner periphery of said cylinder, pressure fluid means including conduits communicating with opposite ends of said cylinder for selective actuation of said piston and tool carrier shaft in either direction, cooperating key and keyway means connecting said cylinder and tool carrier shaft for bodily rotation together, drive means for rotating said cylinder to impart rotation to said tool carrier shaft, a centrally apertured end plate substantially sealing the end of said cylinder adjacent said spindle, said carrier shaft extending through said central aperture in said plate, said keyway means being provided in said carrier shaft substantially throughout the length thereof and said cooperating key means being provided in said end plate, means defining a peripherally sealed chamber between said end plate and the adjacent end of said spindle, said chamber being in leaking communication with the interior of said cylinder through said keyway and communicating with the interior of said hollow spindle, coolant fluid means including a delivery line communicating with said chamber, and means for delivering coolant fluid under pressure to said chamber and thence through said spindle and past said boring head and out through said tube and into a sump, said coolant fluid being the same as said first mentioned pressure fluid.

5. In a tube boring machine, in combination, a hollow spindle, means supporting said spindle for rotation, means for rotatably supporting a tube in alignment with said spindle and means for connecting adjacent ends of said tube and spindle for bodily rotation, annular sealing means between adjacent surfaces of said tube and spindle, a tool carrier shaft extending through the hole in said spindle, a boring tool carried on the end of said carrier shaft adjacent said tube for boring engagement with said tube, means for rotating said carrier shaft relative to said spindle and tube and means for axially displacing said carrier shaft, and means for delivering coolant fluid under pressure into the end of said spindle remote from said tube and through said hole past said tool and out through said tube.

6. A tube boring machine as claimed in claim 5, wherein the tool carrier shaft extending through the hole in said spindle is in closely spaced relation with the periphery of said hole.

7. In a tube boring machine as claimed in claim 6, a piston secured on the end of said carrier shaft remote from the tool, a hydraulic cylinder mounted for rotation in alignment with said spindle and axially receiving said carrier shaft through an end thereof with said piston in cooperating relation with said cylinder, means connecting said cylinder and carrier shaft for relative axial displacement with respect to each other and bodily rotation with each other, means for rotating said cylinder, and means for delivering pressure fluid to either end of the cylinder for axially displacing said carrier shaft.

8. In a tube boring machine as claimed in claim 7, a centrally apertured end plate substantially sealing one end of said cylinder, said carrier shaft extending through said central aperture in said plate, keyway means in said carrier shaft substantially throughout the length thereof and cooperating key means in said end plate.

9. In a tube boring machine as claimed in claim 7, wherein the cylinder end remote from the recessed shaft is open, a bearing support for said cylinder end, said support having an outer end wall defining a sealed chamber communicating with the cylinder through said open end thereof, and said chamber being connected with one of said means for delivering pressure fluid.

10. In a tube boring machine as claimed in claim 7, frame means including first axially aligned spaced bearing means supporting said spindle, second axially aligned spaced bearing means supporting said cylinder, means defining a sealed chamber between adjacent ones of said first and second bearing means, means connecting said chamber with the hollow interior of said spindle, and further pressure fluid means including a delivery line communicating with said chamber, whereby fluid is adapted to be delivered through said chamber and thence through the interior of said spindle and past said boring head and out through said tube and into a sump.

11. In a tube boring machine as claimed in claim 10, a centrally apertured end plate substantially sealing the end of said cylinder adjacent said hollow spindle, said carrier shaft extending through said central aperture in said plate, keyway means in said carrier shaft substantially throughout the length thereof and cooperating key means in said end plate, means defining a peripherally sealed chamber between said end plate and the adjacent end of said spindle, said chamber being in leaking communication with the interior of said cylinder through said keyway and communicating with the interior of said spindle, coolant fluid means including a delivery line communicating with said chamber, means for delivering coolant fluid under pressure to said chamber and thence through said spindle hole and past said boring tool and out through said tube and into a sump, said coolant fluid being the same as said first mentioned pressure fluid.

12. In a tube boring machine as claimed in claim 5, hydraulic cylinder and piston means in alignment with said spindle for axially displacing said carrier shaft.

References Cited in the file of this patent

UNITED STATES PATENTS

| | | |
|---|---|---|
| 995,572 | Rowe | June 20, 1911 |
| 1,630,083 | Hinckley et al. | May 24, 1927 |
| 2,240,795 | Morgan et al. | May 6, 1941 |
| 2,413,022 | Woody | Dec. 24, 1946 |
| 2,418,841 | Karweit | Apr. 15, 1947 |